United States Patent
Nathan

(10) Patent No.: US 9,123,954 B2
(45) Date of Patent: Sep. 1, 2015

(54) THREE-DIMENSIONAL MICROBATTERY HAVING A POROUS SILICON ANODE

(75) Inventor: Menachem Nathan, Tel Aviv (IL)

(73) Assignee: RAMOT AT TEL-AVIV UNIVERSITY LTD., Tel Aviv (IL)

(*) Notice: Subject to any disclaimer, the term of this patent is extended or adjusted under 35 U.S.C. 154(b) by 279 days.

(21) Appl. No.: 13/697,529

(22) PCT Filed: May 23, 2011

(86) PCT No.: PCT/IB2011/052232
§ 371 (c)(1), (2), (4) Date: Nov. 13, 2012

(87) PCT Pub. No.: WO2011/154862
PCT Pub. Date: Dec. 15, 2011

(65) Prior Publication Data
US 2013/0078513 A1    Mar. 28, 2013

Related U.S. Application Data

(60) Provisional application No. 61/351,891, filed on Jun. 6, 2010.

(51) Int. Cl.
*H01M 2/26* (2006.01)
*H01M 4/38* (2006.01)
*H01G 11/06* (2013.01)
(Continued)

(52) U.S. Cl.
CPC .............. *H01M 4/386* (2013.01); *H01G 11/06* (2013.01); *H01G 11/26* (2013.01); *H01G 11/50* (2013.01); *H01M 4/0402* (2013.01); *H01M 4/044* (2013.01); *H01M 4/134* (2013.01); *H01M 4/1395* (2013.01); *H01M 4/38* (2013.01); *H01M 4/382* (2013.01); *H01M 4/80* (2013.01); *H01M 10/0436* (2013.01); *H01M 10/052* (2013.01); *H01M 10/058* (2013.01); *H01M 4/04* (2013.01);
(Continued)

(58) Field of Classification Search
CPC ...................................................... H01M 2/266
USPC ................................................. 429/400–535
See application file for complete search history.

(56) References Cited

U.S. PATENT DOCUMENTS

| 4,173,745 A | 11/1979 | Saunders |
| 4,346,153 A | 8/1982 | Rigal et al. |

(Continued)

FOREIGN PATENT DOCUMENTS

| EP | 0331342 A2 | 9/1989 |
| EP | 0450848 A3 | 10/1991 |

(Continued)

OTHER PUBLICATIONS

U.S. Appl. No. 10/531,529 Official Action dated Oct. 18, 2011.
(Continued)

*Primary Examiner* — Kenneth Douyette
*Assistant Examiner* — James Lee
(74) *Attorney, Agent, or Firm* — D. Kligler I.P. Services Ltd.

(57) ABSTRACT

An electrical energy storage device (20) includes a silicon substrate (22), which is formed so as to define a multiplicity of micro-containers (24, 26) having porous silicon walls (28), which are configured to serve as an anode layer. A cathode layer (34) overlies the micro-containers, with a separator layer (32) intermediate the anode layer and the cathode layer.

6 Claims, 3 Drawing Sheets

(51) Int. Cl.
| | |
|---|---|
| H01G 11/26 | (2013.01) |
| H01G 11/50 | (2013.01) |
| H01M 4/134 | (2010.01) |
| H01M 4/1395 | (2010.01) |
| H01M 10/04 | (2006.01) |
| H01M 10/052 | (2010.01) |
| H01M 10/058 | (2010.01) |
| H01M 4/80 | (2006.01) |
| H01M 4/04 | (2006.01) |
| H01M 10/0565 | (2010.01) |

(52) U.S. Cl.
CPC .......... *H01M 10/0565* (2013.01); *Y02E 60/122* (2013.01); *Y02E 60/13* (2013.01)

(56) References Cited

U.S. PATENT DOCUMENTS

| | | |
|---|---|---|
| 4,416,915 A | 11/1983 | Palmer et al. |
| 4,659,637 A | 4/1987 | Nelson et al. |
| 4,822,701 A | 4/1989 | Ballard et al. |
| 4,878,094 A | 10/1989 | Balkanski |
| 4,906,536 A | 3/1990 | Simonton |
| 5,019,468 A | 5/1991 | Miyabayashi |
| 5,041,199 A | 8/1991 | Di Franco |
| 5,162,178 A | 11/1992 | Ohsawa et al. |
| 5,187,564 A | 2/1993 | McCain |
| 5,268,243 A | 12/1993 | Noda et al. |
| 5,338,625 A | 8/1994 | Bates et al. |
| 5,498,312 A | 3/1996 | Laermer et al. |
| 5,508,542 A | 4/1996 | Geiss et al. |
| 5,545,308 A | 8/1996 | Murphy et al. |
| 5,567,210 A | 10/1996 | Bates et al. |
| 5,654,114 A | 8/1997 | Kubota et al. |
| 5,672,446 A | 9/1997 | Barker et al. |
| 5,916,514 A | 6/1999 | Eshraghi |
| 6,025,094 A | 2/2000 | Visco et al. |
| 6,025,225 A | 2/2000 | Forbes et al. |
| 6,197,450 B1 | 3/2001 | Nathan et al. |
| 6,214,161 B1 | 4/2001 | Becker et al. |
| 6,260,388 B1 | 7/2001 | Borrelli et al. |
| 6,264,709 B1 | 7/2001 | Yoon et al. |
| 6,270,714 B1 | 8/2001 | Azran et al. |
| 6,300,709 B1 | 10/2001 | DeVoe et al. |
| 6,303,512 B1 | 10/2001 | Laermer et al. |
| 6,316,142 B1 | 11/2001 | Delnick et al. |
| 6,610,440 B1 | 8/2003 | LaFollette et al. |
| 6,720,273 B1 | 4/2004 | Becker et al. |
| 7,204,862 B1 | 4/2007 | Zhang |
| 7,618,748 B2 | 11/2009 | Nathan |
| RE41,578 E | 8/2010 | Nathan et al. |
| RE42,073 E | 1/2011 | Nathan et al. |
| RE42,273 E | 4/2011 | Nathan et al. |
| 2002/0132167 A1 | 9/2002 | Gan et al. |
| 2003/0077515 A1 | 4/2003 | Chen et al. |
| 2003/0170533 A1 | 9/2003 | Airey et al. |
| 2004/0055420 A1 | 3/2004 | Garbar et al. |
| 2006/0032046 A1 | 2/2006 | Nathan et al. |
| 2009/0142656 A1 | 6/2009 | Nathan et al. |
| 2009/0170001 A1 | 7/2009 | Roozeboom et al. |
| 2011/0045351 A1 | 2/2011 | Peled et al. |

FOREIGN PATENT DOCUMENTS

| | | |
|---|---|---|
| EP | 1134821 A1 | 9/2001 |
| FR | 2550015 A1 | 2/1985 |
| FR | 2606207 A1 | 5/1988 |
| FR | 2621174 A1 | 3/1989 |
| GB | 2161988 A1 | 1/1986 |
| JP | 2168560 A | 6/1990 |
| NL | 1015956 C2 | 2/2002 |
| WO | 2005027245 A | 3/2005 |
| WO | 2005036711 A2 | 4/2005 |
| WO | 2005101973 A2 | 11/2005 |
| WO | 2006056964 A2 | 6/2006 |
| WO | 2011053736 A1 | 5/2011 |

OTHER PUBLICATIONS

International Application PCT/IB2011/052232 Search Report dated Aug. 30, 2011.
U.S. Appl. No. 10/531,529 Official Action dated May 12, 2011.
U.S. Appl. No. 12/859,297 Official Action dated Oct. 26, 2012.
Yufit et al., "Thin-film lithium and lithium-ion batteries with electrochemically deposited molybdenum oxysulfide cathodes", Journal of Power Sources 122, pp. 169-173, 2003.
U.S. Appl. No. 10/531,529 Official Action dated Mar. 3, 2011.
U.S. Appl. No. 11/374,469 Office Action dated Apr. 16, 2009.
U.S. Appl. No. 10/531,529 Office Action dated Jan. 15, 2010.
U.S. Appl. No. 10/531,529 Office Action dated Jun. 23, 2009.
U.S. Appl. No. 10/531,529 Office Action dated Aug. 3, 2010.
International Application PCT/IL2003/000623 Search Report dated Nov. 29, 2004.
Roy et al., "Hydrothermal Growth of CuS Nanowires from Cu-Dithiooxamide, a Novel Single Source Precursor", Crystal Growth & Design, vol. 6, No. 8, pp. 1921-1926, year 2006.
Wang et al., "Developments in Nanostructured Cathode Materials for High-Performance Lithium-Ion Batteries", Advanced Materials, vol. 20, issue 12, pp. 2251-2269, Jun. 18, 2008.
Dupin et al., "Amorphous Oxysulfide Thin Films MOySz (M=W, Mo, Ti) XPS Characterization: Structural and Electronic Peculiarities", Applied Surface Science, vol. 173, pp. 140-150, year 2001.
Howard et al., "Theoretical Evaluation of High-Energy Lithium Metal Phosphate Cathode Materials in Li-ion Batteries", Journal of Power Sources, vol. 165, pp. 887-891, year 2007.
Gao et al., "Fabrication and Electron Field Emission Properties of Carbon Nanotube Films by Electrophoretic Deposition", Advanced Materials, vol. 13, No. 23, pp. 1770-1773, Dec. 3, 2001.
Devadasan et al., "Electrodeposition of P-ws2 Thin-Film and Characterisation", Journal of Crystal Growth, vol. 226, issue 1, pp. 67-72, Jun. 2001.
Miki et al., "Amorphous MoS2 as the cathode of lithium secondary batteries", Journal of Power Sources, vol. 54, issue 2, pp. 508-510, Apr. 1995.
Ponomarev et al., "Electrochemical deposition of MoS2 thin films by reduction of tetrathiomolybdate", vol. 280, Issues 1-2, pp. 86-89, Jul. 1996.
Long et al., "Three-Dimensional Battery Architectures", Chemical Review, vol. 10, No. 104, pp. 4463-4492, Oct. 2004.
Hart et al., "3-D Microbatteries", Electrochemistry Communications, vol. 5, pp. 120-123, year 2003.
Kleimann et al., "Formation of Wide and Deep Pores in Silicon by Electrochemical Etching", Materials Science and Engineering B, vols. 69-700, pp. 29-33, year 2000.
Li et al., "Microfabrication of Thermoelectric Materials by Silicon Molding Process", Sensors and Actuators a, vol. 108, pp. 97-102, year 2003.
Kim et al., "Three-Dimensional Porous Silicon Particles for Use in High-Performance Lithium Secondary Batteries", Angewandte Chemie, vol. 47, issue 52, pp. 10151-10154, year 2008.
Golodnitsky et al., "Progress in Three-Dimensional (3D) Li-ion Microbatteries", Solid State Ionics, vol. 177, pp. 2811-2819, year 2006.
Steingart et al., "Micropower Materials Development for Wireless Sensor Networks", MRS Bulletin, vol. 33, No. 3, pp. 408-409, Apr. 2008.
Patil et al., "Issue and challenges facing rechargeable thin film lithium batteries", Materials Research Bulletin, vol. 43, Issues 8-9, pp. 1913-1942, Aug. 4-Sep. 4, 2008.
Sailor et al., "Smart Dust: Nanostructured Devices in a Grain of Sand", Chemical Communications, pp. 1375-1383, year 2005.
Kim et al., "Micro-Capsule Endoscope for Gastro Intestinal Tract", Proceedings of the 29th Conference of IEEE Engineering in Medicine and Biology Society, Lyon, France, Aug. 23-26, 2007.
Golodnitsky et al., "Advanced materials for the 3D microbattery", Journal of Power Sources, vol. 153, pp. 281-287, year 2006.

(56) References Cited

OTHER PUBLICATIONS

Nathan et al., "Three-dimensional thin-film Li-ion microbatteries for autonomous MEMS", Journal of Microelectromechanical Systems, vol. 14, issue 5, pp. 879-885, Oct. 2005.
Bonino et al., "Electrochemical Behavior of Solid Cathode Materials in Organic Electrolyte Lithium Batteries: Copper Sulfides", Journal of the Electrochemical Society, vol. 131, Issue 7, pp. 1498-1502, Jul. 1984.
Miller et al., "Semiconductor liquid junction solar cells based on anodic sulphide films", Nature, vol. 262, pp. 680-681, Aug. 19, 1976.
Peter, L.M., "The electrocrystallisation of cadmium sulphide films of cadmium", Electrochimica Acta, vol. 23, issue 3, pp. 165-174, Mar. 1978.
Engelken et al., "Electrodeposition and Material Characterization of CuxS Films", Journal of the Electrochemical Society, vol. 132, issue 3, pp. 567-573, Mar. 1985.
Panicker et al., "Cathodic Deposition of CdTe from Aqueous Electrolytes", Journal of the Electrochemical Society, vol. 125, issue 4, pp. 566-572, Apr. 1978.
Chung et al., "Electrochemical behaviors of CuS as a cathode material for lithium secondary batteries", Journal of Power Sources, vol. 108, issues 1-2, pp. 226-231, Jun. 2002.
Cheah et al., "Self-Supported Three-Dimensional Nanoelectrodes for Microbattery Applications", NANO Letters, vol. 9, issue 9, p. 3230, Jul. 2, 2009.
Ancutiene et al., "Formation and characterization of conductive thin layers of copper sulfide (CuxS) on the surface of polyethylene and polyamide by the use of higher polythionic acids", Applied Surface Science Journal, vol. 252, issue 12, pp. 4218-4225, Apr. 16, 2006.
He et al., "Hall effect and surface characterization of Cu2S and CuS films deposited by Rf reactive sputtering", Journal Physica B: Condensed Matter, vols. 308-310, pp. 1069-1073, Dec. 2001.
Nadel, D.J., "Microsensor clusters", Microelectronic Journal, vol. 33, issue 1-2, pp. 107-119, Jan. 2002.
Lehmann et al., "A Novel Capacitor Technology Based on Porous Silicon", Thin Solid Films Journal, vol. 276, issue 1-2, pp. 138-142, Apr. 15, 1996.
Owen, "Ionically Conducting Glasses", Solid State Batteries, Sequiera and Hooper, Nato Science Series E, Springer, Oct. 1985.
U.S. Appl. No. 10/382,466 Official Action dated Apr. 11, 2005.
U.S. Appl. No. 11/866,722 Official Action dated May 29, 2009.
U.S. Appl. No. 12/834,498 Official Action dated Jul. 22, 2010.
U.S. Appl. No. 10/382,466 Official Action dated Jan. 29, 2007.
U.S. Appl. No. 10/382,466 Advisory Action dated May 9, 2007.
U.S. Appl. No. 10/382,466 Official Action dated Feb. 22, 2008.
U.S. Appl. No. 10/382,466 Official Action dated Jan. 13, 2009.
U.S. Appl. No. 10/382,466 Official Action dated May 18, 2009.
Patent Abstracts of Japan, Publication No. 09-186461, Jul. 15, 1997.
Princeton Applied Research, "263A potentiostat/galvanostat", Aug. 1, 2008.
Jeol Ltd., "JEOL JSM-6300 Scanning Electron Microscope", User Guide, Aug. 3, 2004.
Physical Electronics Inc., "XPS System—PHI 5600-CI", Feb 20, 2007 (http://www.ifw-dresden.de/institutes/ikm/organisation/dep-31/equipment).
Celgard LLC, "Product Celgard® 2400", May 2009.
Fragnaud et al., "Thin-Film Cathodes for Secondary Lithium Batteries", Journal of Power Sources, vol. 54, pp. 362-366, Apr. 1995.
Albu-Yaron et al., "Influence of the Electromechanical Deposition Parameters on the Microstructure of MoS2 Thin Films", Thin Solid Films, vols. 361-362, No. 1, pp. 223-228, Feb. 2000.
International Application PCT/IL2007/000167 Search Report dated Jul. 12, 2007.
Jones et al., "A Thin Film Sold State Microbattery", Solid State Ionics, vols. 53-56, Part 1 pp. 628-634, Jul.-Aug. 1992.
Martin-Litas et al., "Promising thin films (WO1.05S2 and WO1. 35S2.2) as positive electrode materials in microbatteries", Journal of Power Sources, vols. 97-98, pp. 545-547, Jul. 2001.
De Tacconi et al., "Study of Copper Sulfide Film Formation by Voltammetry Combined with Electrochemical Quartz Crystal Microgravimetry/Coulometry and Optical Spectroscopy", The Journal of Physical Chemistry, vol. 100, issue 46, pp. 18234-18239, Nov. 14, 1996.
U.S. Appl. No. 12/859,297 Office Action action dated Mar. 15, 2013.

THREE-DIMENSIONAL MICROBATTERY HAVING A POROUS SILICON ANODE

CROSS-REFERENCE TO RELATED APPLICATION

This application claims the benefit of U.S. Provisional Patent Application 61/351,891, filed Jun. 6, 2010, which is incorporated herein by reference.

FIELD OF THE INVENTION

The invention relates generally to electrical energy sources, and particularly to three-dimensional (3D) microbatteries.

BACKGROUND OF THE INVENTION

Miniature, two-dimensional thin-film micro-batteries are known in the art. For example, U.S. Pat. Nos. 5,338,625 and 5,567,210, whose disclosures are incorporated herein by reference, describe a thin-film microbattery used as a backup or primary integrated power source for electronic devices. The battery includes a lithium anode, an electrochemically-stable electrolyte and a vanadium-oxide cathode. The battery is fabricated directly onto a semiconductor chip, onto a semiconductor die, or onto a portion of a chip carrier.

U.S. Pat. No. 6,610,440, whose disclosure is incorporated herein by reference, describes microscopic batteries that are integratable or integrated with micro-electromechanical (MEMS) systems or other microscopic circuits. The inventors describe closed system microscopic batteries used for internal storage of electricity using interval reactants. The batteries comprise microscopic electrodes, electrolyte and a reservoir for the electrolyte.

A three-dimensional thin-film microbattery is described in U.S. Pat. No. 6,197,450, whose disclosure is incorporated herein by reference. Thin-film micro-electrochemical energy storage cells (MEESC) such as microbatteries and double-layer capacitors (DLC) are described. The energy storage cells comprise two thin layer electrodes, an intermediate thin layer of a solid electrolyte and an optional fourth thin current collector layer. The layers are deposited in sequence on a surface of a substrate. The substrate comprises multiple through-cavities of arbitrary shape, with high aspect ratio, which increase the total electrode area per volume ratio.

Three-dimensional microbatteries are also described by Long et al., in "Three-Dimensional Battery Architectures," *Chemical Review*, volume 10, number 104 (October, 2004), pages 4463-4492, which is incorporated herein by reference.

Geometric configurations of 3D microbatteries are described by Hart et al., in "3-D Microbatteries," *Electrochemistry Communications*, volume 5 (2003), pages 120-123, which is incorporated herein by reference. This paper presents finite-element simulations showing current and potential distribution for several cathode-anode array configurations.

A method for producing arrays of cavities in silicon is described by Kleimann et al., in "Formation of Wide and Deep Pores in Silicon by Electrochemical Etching," *Materials Science and Engineering B*, volume 69-70 (2000), pages 29-33, which is incorporated herein by reference. Another process for producing micro-cavity arrays is described by Li et al., in "Microfabrication of Thermoelectric Materials by Silicon Molding Process," *Sensors and Actuators A*, volume 108 (2003), pages 97-102, which is incorporated herein by reference. The authors describe a process for fabricating thermoelectric micro-modules with densely-aligned, fine-scale and high-aspect-ratio elements.

U.S. Patent Application Publication 2009/0142656, whose disclosure is incorporated herein by reference, describes an electrical energy storage device, which includes a substrate formed so as to define a multiplicity of micro-containers separated by electrically-insulating and ion-conducting walls. A first plurality of anodes is disposed in a first subset of the micro-containers, and a second plurality of cathodes is disposed in a second subset. The anodes and cathodes are arranged in an interlaced pattern.

SUMMARY

Embodiments of the invention described hereinbelow provide improved designs for 3D microbatteries.

There is therefore provided, in accordance with an embodiment of the invention, an electrical energy storage device, including a silicon substrate, which is formed so as to define a multiplicity of micro-containers having porous silicon walls, which are configured to serve as an anode layer. A cathode layer overlies the micro-containers, with a separator layer intermediate the anode layer and the cathode layer.

In some embodiments, the porous silicon is impregnated with lithium. The porous silicon may extend through an entire thickness of the walls or partially through the walls.

In a disclosed embodiment, the device includes an anode current collector in electrical communication with the anode layer and a cathode current collector in electrical communication with the cathode layer.

In some embodiments, the cathode and separator layers extend into the micro-containers. The micro-containers may include first and second sets of the micro-containers, which are respectively formed in opposing, first and second surfaces of the substrate, wherein the cathode and separator layers extend into only the first subset of the micro-containers.

In an alternative embodiment, the separator layer includes an electrolyte, which fills at least some of the micro-containers, and the cathode layer is a planar layer covering the at least some of the micro-containers.

There is also provided, in accordance with an embodiment of the invention, a method for fabricating an electrical energy storage device, which includes forming a multiplicity of micro-containers in a substrate, the micro-containers having walls including porous silicon configured to serve as an anode layer. A separator layer is formed over the walls in the micro-containers, and a cathode layer is disposed over the separator layer.

There is additionally provided, in accordance with an embodiment of the present invention, a microelectronic device, including a silicon substrate and a microcircuit disposed on the substrate. An electrical energy storage device is disposed in the substrate and coupled to provide electrical power to the microcircuit. The storage device includes a multiplicity of micro-containers formed in the substrate and having walls including porous silicon configured to serve as an anode layer. A cathode layer overlies the micro-containers, with a separator layer intermediate the anode layer and the cathode layer.

The invention will be more fully understood from the following detailed description of the embodiments thereof, taken together with the drawings in which:

DETAILED DESCRIPTION OF EMBODIMENTS

Silicon is known as a material capable of providing one of the highest capacities for lithium-ion insertion (or intercalation). Use of silicon as an anode material in lithium-ion batteries, however, is problematic, because insertion of lithium ions into the silicon causes a huge volume expansion (approximately 400%) of the silicon. This expansion results in disintegration of the silicon, loss of its electrical conductivity, and loss of electrical contact with the current collector of the battery. The disintegration problem may be solved by use of porous silicon (PS), as described by Hyunjung Kim, et al., in "Three-Dimensional Porous Silicon Particles for Use in High-Performance Lithium Secondary Batteries," *Angewandte Chemie*, volume 47, issue 52 (2008), pages 10151-10154, which is incorporated herein by reference.

In embodiments of the invention, 3D microbatteries comprise high-capacity anodes made from porous silicon. In some embodiments, the microbatteries comprise 3D thin-film batteries (TFBs), in which both the cathodes and anodes have thicknesses of the order of a fraction of a micron to a few microns, or possibly a few tens of microns. The use of porous silicon anodes in 3D TFBs in advantageous in terms of increased energy and capacity relative to the battery footprint.

Figure 1:
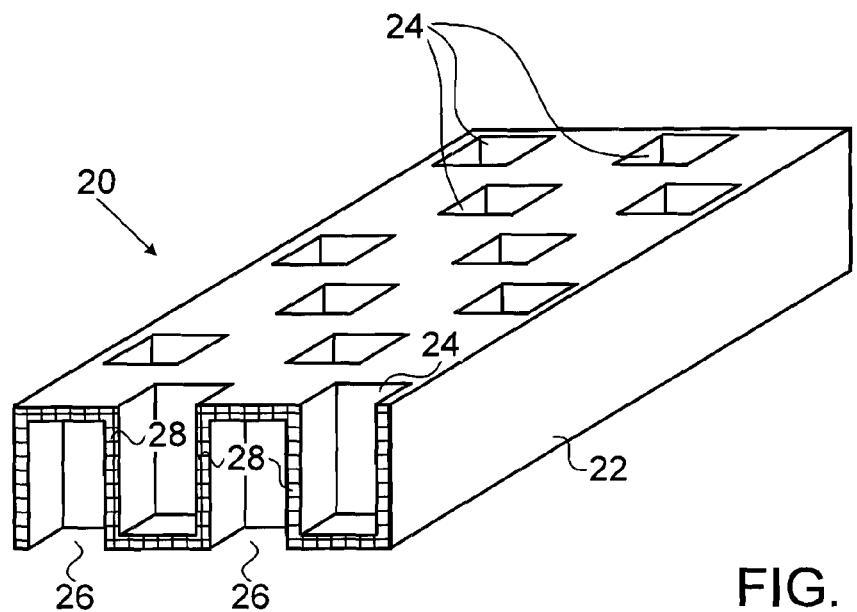
FIG. 1 is a schematic, pictorial illustration of a substrate of a 3D microbattery, in accordance with an embodiment of the invention.

FIG. 1 is a pictorial, schematic illustration of a semiconductor substrate 20, which is used in producing a microbattery in accordance with an embodiment of the invention. Substrate 20 is typically formed from a silicon wafer 22, or from a stack of such wafers.

Alternatively, other suitable semiconductors or other materials, such as InGaP, GaAs, GaN, or SiC, may be used for this purpose. The typical thickness of wafer 22 is in the range of 100-800 microns, although the methods described below can be used to fabricate microbatteries of larger or smaller thickness. Methods for forming this sort of substrate are described in detail in the above-mentioned U.S. Patent Application Publication 2009/0142656.

Substrate 20 comprises two sets of cavities, referred to herein as "micro-containers," formed in substrate 20. A first set of micro-containers 24 is formed in a first side of substrate 20. A second set of micro-containers 26 is formed in the opposite side of the substrate. The two sets of micro-containers are typically arranged in a periodic, interlaced pattern in substrate 20. (The interlaced pattern is sometimes referred to as an "interdigitated" pattern.) Alternatively, other arrangements of the micro-containers are possible, including arrangements in which all of the micro-containers open to the same side of the substrate.

Micro-containers 24 and 26 may conveniently be made square in shape, as shown in FIG. 1. Alternatively, other suitable micro-container shapes, such as triangular, rectangular, hexagonal or round micro-containers may be used. As used herein, the term "micro-container" may refer to any three-dimensional structure formed in substrate 20 by removal (by etching, for example) of material, such as a trench, a hole, or a cavity. The characteristic width or diameter of the micro-containers typically ranges from several microns up to several tens of microns. The total number of micro-containers in a typical 1 $cm^2$ microbattery can vary from several hundred to several tens of thousands, depending on the micro-container width, the wall thickness, and the electrical specifications of the battery. Typically, the micro-containers have a high aspect ratio, i.e., their depth is significantly larger than their width or diameter. In general, the micro-containers need not all be of identical size or shape.

The two sets of micro-containers 24 and 26 can be fabricated using any of several techniques known in the art. For example, the Kleimann paper cited above describes an electrochemical etching method for forming cavities in a silicon substrate. U.S. Pat. No. 6,197,450, also cited above, describes several alternative methods for etching cavities in substrate materials. One such method is a "dry etching" method, using an inductive-coupled plasma (ICP) process developed by Robert Bosch, GmbH (Stuttgart, Germany), which is described, for example, in U.S. Pat. No. 6,720,273, whose disclosure is incorporated herein by reference. Photolithographic methods may be used to define the two sets of micro-containers 24 and 26 prior to etching.

Micro-containers 24 and 26 are separated by walls 28, which are typically etched to a thickness of several microns. The micro-container formation process is stopped before the cavities penetrate to the opposite surface of substrate 20, typically leaving a bottom thickness in the range of 1-100 microns, generally 10-50 microns. Walls 28 are rendered porous through all or a part of their width, as explained below. The bottom of each set of micro-containers may be made totally or only partially porous, depending on its thickness relative to the thickness of the separating walls between the micro-containers.

In an alternative embodiment, the interlaced structure of micro-containers 24, 26 is fabricated by using two or more wafers. For example, the interlaced structure can be fabricated from three wafers: a middle wafer and two side wafers above and below the middle wafer. The middle wafer is etched or otherwise processed to comprise the two sets of micro-containers, which in this configuration are allowed to penetrate through its entire thickness. One side wafer has holes that match micro-containers 24 and forms the solid bottom for micro-containers 26, while the other side wafer has holes that match micro-containers 26 and forms the solid bottom for micro-containers 24. The three wafers are bonded together to form the 3D double-sided micro-container structure shown in FIG. 1.

Figure 2:
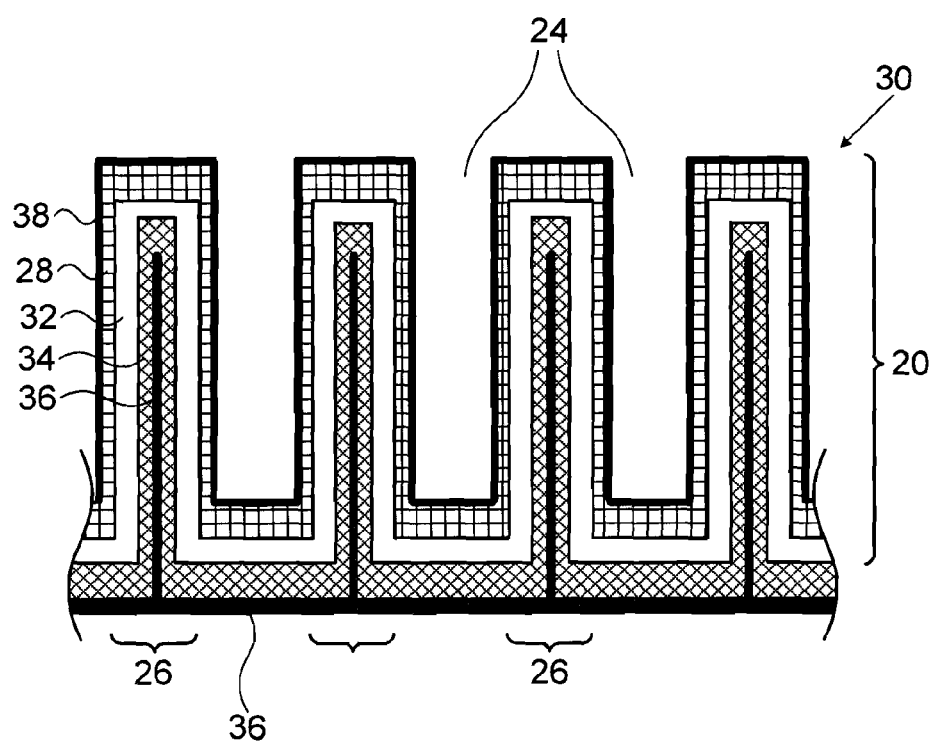
FIG. 2 is a schematic, sectional illustration of a portion of a 3D microbattery, in accordance with an embodiment of the invention.
Figure 3:
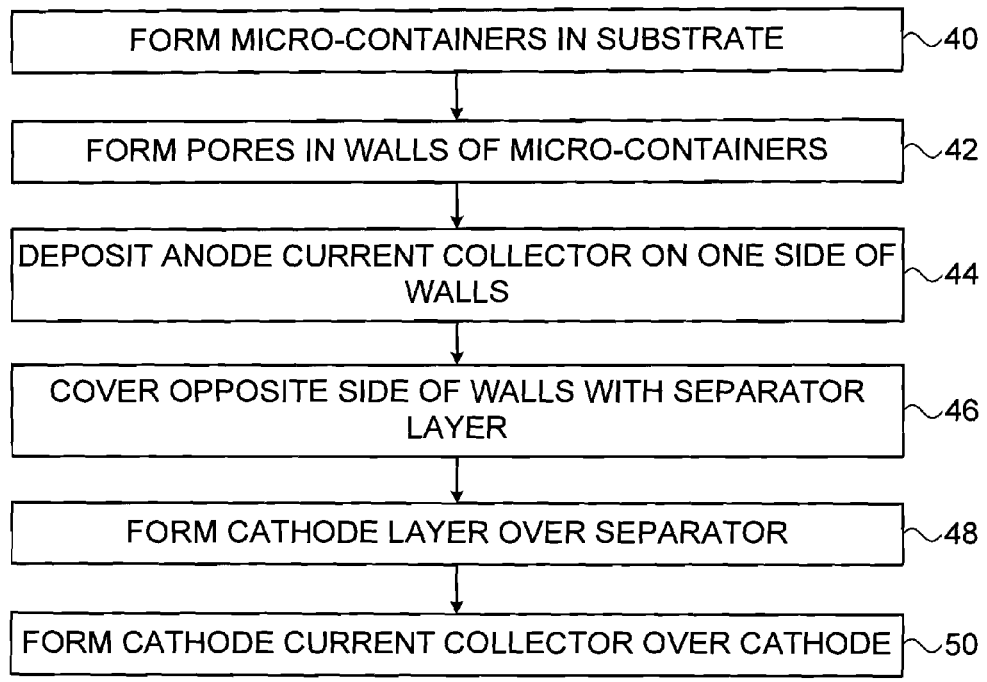
FIG. 3 is a flow chart that schematically illustrates a method for producing a 3D microbattery, in accordance with an embodiment of the invention.

Reference is now made to FIGS. 2 and 3, which schematically illustrate a method for producing 3D microbatteries, in accordance with an embodiment of the invention. FIG. 2 is a schematic, sectional illustration of a portion of a 3D microbattery 30, while FIG. 3 is a flow chart showing the steps of the method. Microbattery 30 is based on substrate 20, in which micro-containers 24 and 26 are formed as described above, in a micro-container formation step 40.

Pores are formed in walls 28 of micro-containers 24 and 26, at a pore formation step 42. The porous walls typically comprise nanometric pores (typically several tens to several hundred nanometers in diameter), which may pass completely through the walls or only part-way through. The process may be adapted and controlled to form pores in only one set of the micro-containers to a depth of choice into the silicon walls. The pores may be formed using a metal-assisted chemical etching process, as described, for example, in the above-mentioned U.S. Patent Application Publication 2009/0142656. Alternatively, electrochemical etching or any other suitable process known in the art may be used to produce the pores in walls 28. The pores may be impregnated with a suitable intercalant, such as lithium. Alternatively, the cathode may be lithiated, rather than the porous silicon anode.

An anode current collector 38 is formed as a thin film layer over micro-containers 24 and over the corresponding surface of substrate 20, at an anode collector deposition step 44. The anode current collector may comprise, for example, copper, nickel, gold, or any other metal or alloy capable of forming low-resistivity ohmic contacts to Si. If the pores in walls extend all the way through to micro-containers 24, then current collector 38 will be in direct ohmic contact with the porous silicon (and with the lithium within the pores). Otherwise, the anode current collector will be in ohmic contact with the non-porous part of the walls. Materials and processes for forming low-resistance ohmic contacts to silicon are well known in the art. As long as the silicon substrate is sufficiently conductive, the contact and internal resistance paths between current collector 38 and the porous silicon of walls 28 will be relatively small because of the short distances and large contact areas, and thus will not cause significant internal voltage drops.

An ion-conducting separator layer 32 is formed on the opposite side of walls 28, over micro-containers 26 and over the corresponding surface of substrate 20, at a separator formation step 46. Layer 32 may comprise, for example, a hybrid polymer electrolyte (HPE). A cathode layer 34 is formed over separator layer 32, at a cathode formation step 48. A cathode current collector 36 is then formed over the cathode layer, at a cathode collector deposition step 50. The cathode and cathode current collector may comprise, for example, any of the corresponding materials enumerated in the above-mentioned U.S. Pat. No. 6,197,450. Cathode current collector 36 is in electrical communication with cathode layer 34, allowing electron or hole transport to and from the cathode.

Alternatively, anode current collector 38 may be formed in step 44 only after formation of the other layers at steps 46, 48 and 50.

Figure 4:
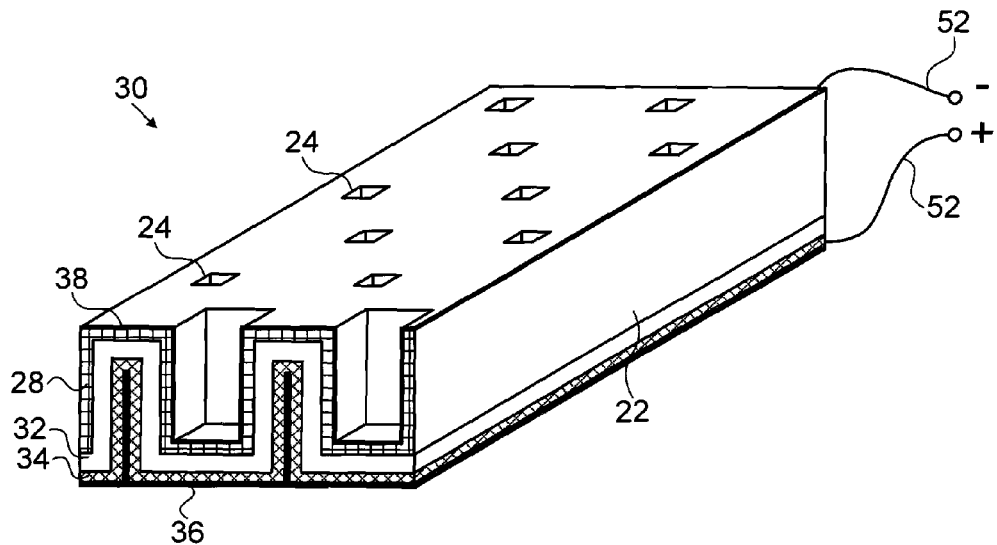
FIG. 4 is a schematic, pictorial illustration of a 3D microbattery, in accordance with an embodiment of the invention.

FIG. 4 is a schematic, pictorial illustration of 3D microbattery 30, at the conclusion of the process described above. The upper surface of the microbattery is covered by anode current collector layer 38, while the lower surface is covered by cathode current collector layer 36. The current collectors are connected to electrical leads 52, through which microbattery 30 may be charged and discharged. Alternatively, if walls 28 (the anode) and/or cathode layer 34 is sufficiently conductive, leads 52 may be attached directly to the anode and/or cathode without an intervening current collector layer.

In an alternative embodiment, the cathode current collector may be made separately from an appropriate metal as a sheet with protrusions made to match micro-containers 26. The protrusions may be coated with a cathode material to a desired thickness (which can be on the order of a few microns). The cathode current collector and cathode can then be mechanically inserted into micro-containers 26 to contact separator layer 32, which was formed in a previous step.

Microbattery 30 has significant advantages in terms of increased energy and capacity relative to battery footprint. For example, for a silicon substrate 0.5 mm thick of area 1 $cm^2$, the formation of 50 micron-wide micro-containers separated by 10 micron walls to a depth of about 450 micron provides a total wall surface of about 10 $cm^2$, which is larger by a factor of about ten than the footprint. The walls may be made porous to a thickness of about 9 microns, for example, thus providing a 9 micron-thick anode. The theoretical capacity of this anode will be equal that of a graphite anode with a thickness 11 times greater. Cathode layer 34 may be deposited to any desired thickness over separator layer 32 within micro-containers 26 and over the corresponding surface of substrate 20 to control the energy capacity of the microbattery or to make the capacity of the microbattery anode-limited.

In an alternative embodiment (not shown in the figures), a set of micro-containers with a porous silicon anode is formed as described above. The micro-containers are filled with a liquid electrolyte and then covered by a separator sheet, such as a Celgard® separator (produced by Celgard, LLC, Charlotte, N.C.). This separator is typically overlaid with a planar cathode layer and a current collector layer. This configuration maintains the advantage of large anode area and volume relative to planar designs.

Figure 5:
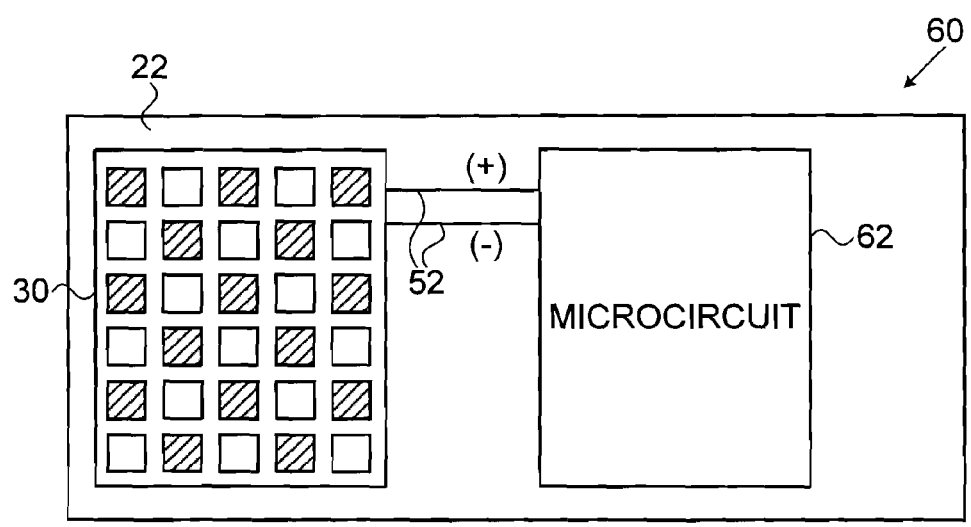
FIG. 5 is a schematic top view of a microelectronic device, in accordance with an embodiment of the invention.

FIG. 5 is a schematic top view of a microelectronic device 60, in accordance with an embodiment of the invention. Device 60 comprises silicon wafer 22, in which microbattery 30 is formed as described above. An electrical microcircuit 62 is also fabricated on wafer 22, using methods of integrated circuit fabrication that are known in the art. Microcircuit 62 is powered by microbattery 30 via leads 52. Thus, device 60 is compact and self-powered, without requiring an external energy source.

Although the embodiments described above relate specifically to the fabrication of 3-D microbatteries, the principles of the invention can also be applied in fabricating other sorts of energy storage devices, such as capacitors, using micro-containers and a porous semiconductor anode. It will thus be appreciated that the embodiments described above are cited by way of example, and that the invention is not limited to what has been particularly shown and described hereinabove. Rather, the scope of the invention includes both combinations and subcombinations of the various features described hereinabove, as well as variations and modifications thereof which would occur to persons skilled in the art upon reading the foregoing description and which are not disclosed in the prior art.

The invention claimed is:

1. An electrical energy storage device, comprising:
   a silicon substrate, which has opposing first and second surfaces and is formed so as to define a multiplicity of micro-containers having porous silicon walls, which are configured to serve as an anode layer, the multiplicity of the micro-containers comprising first and second sets of the micro-containers, which are respectively formed in the opposing, first and second surfaces of the substrate in an interlaced pattern, in which the micro-containers in the first set are interdigitated with neighboring micro-containers in the second set;
   a cathode layer overlying and extending into only the first set of the micro-containers; and
   a separator layer extending into only the first set of the micro-containers, intermediate the anode layer and the cathode layer.

2. The device according to claim 1, wherein the porous silicon is impregnated with lithium.

3. The device according to claim 1, and comprising an anode current collector overlying and extending into the second set of the micro-containers and in electrical communication with the anode layer.

4. The device according to claim 1, and comprising a cathode current collector in electrical communication with the cathode layer.

5. The device according to claim 1, wherein the porous silicon extends through an entire thickness of the walls.

6. The device according to claim 1, wherein the porous silicon extends partially through the walls.

\* \* \* \* \*